United States Patent [19]

Yurtin et al.

[11] Patent Number: 5,071,219

[45] Date of Patent: Dec. 10, 1991

[54] FIBER OPTIC CONNECTION SYSTEM AND METHOD

[75] Inventors: John A. Yurtin, Southington; Kenneth P. Cope, Warren; Joseph H. Gladd, Cortland; Robert G. Plyer, Vienna; Robert E. Steele, Cortland, all of Ohio

[73] Assignee: General Motors Corporation, Detroit, Mich.

[21] Appl. No.: 612,014

[22] Filed: Nov. 9, 1990

[51] Int. Cl.$^5$ .................................................. G02B 6/26
[52] U.S. Cl. .......................................... 385/78; 385/89
[58] Field of Search .............. 350/96.20, 96.21, 96.15, 350/96.22, 96.23, 320; 250/227.11

[56] References Cited

U.S. PATENT DOCUMENTS

| | | | |
|---|---|---|---|
| 4,533,209 | 8/1985 | Segerson et al. | 350/96.20 |
| 4,657,340 | 4/1987 | Tanaka et al. | 350/96.20 |
| 4,778,240 | 10/1988 | Komatsu | 350/96.20 |
| 4,798,440 | 1/1989 | Hoffer et al. | 350/96.20 |
| 4,812,006 | 3/1989 | Osborn et al. | 350/96.21 |
| 4,838,641 | 6/1989 | Morimoto et al. | 350/96.21 |
| 4,872,736 | 10/1989 | Myers et al. | 350/96.20 |
| 4,953,940 | 9/1990 | Lanzetta, Jr. et al. | 350/96.20 |
| 4,979,792 | 12/1990 | Weber et al. | 350/96.20 |
| 4,993,803 | 2/1991 | Suverison et al. | 350/96.20 |
| 5,000,536 | 3/1991 | Anderson et al. | 350/96.20 |

OTHER PUBLICATIONS

AMP brochure IS 9429 entitled "AMP Optimate FSD Wall Outlet Assembly", released 5-8-89.

*Primary Examiner*—Brian Healy
*Attorney, Agent, or Firm*—Francis J. Fodale

[57] ABSTRACT

A fiber-optic connection system comprises three interfitting plastic parts. A two-piece cable terminal includes a cable receiving body and a terminal body. The terminal body has two spaced projections which mount the fiber ends and has a pair of converging cable guide walls. The cable receiving body has walls with gripper teeth complementary to the guide walls. When two cable strands are introduced and the bodies are interconnected to form the terminal connector, the walls trap the cables. The fiber ends are finished by hot plate melting. The terminal connector is inserted into a header having pockets to mount electro-optical devices. The pockets have integral spring rails to force the devices into contact with the projections containing the fiber ends upon assembly. A series of integral lock tangs and shoulders retain the component parts interconnected to prevent inadvertant disassembly.

44 Claims, 2 Drawing Sheets

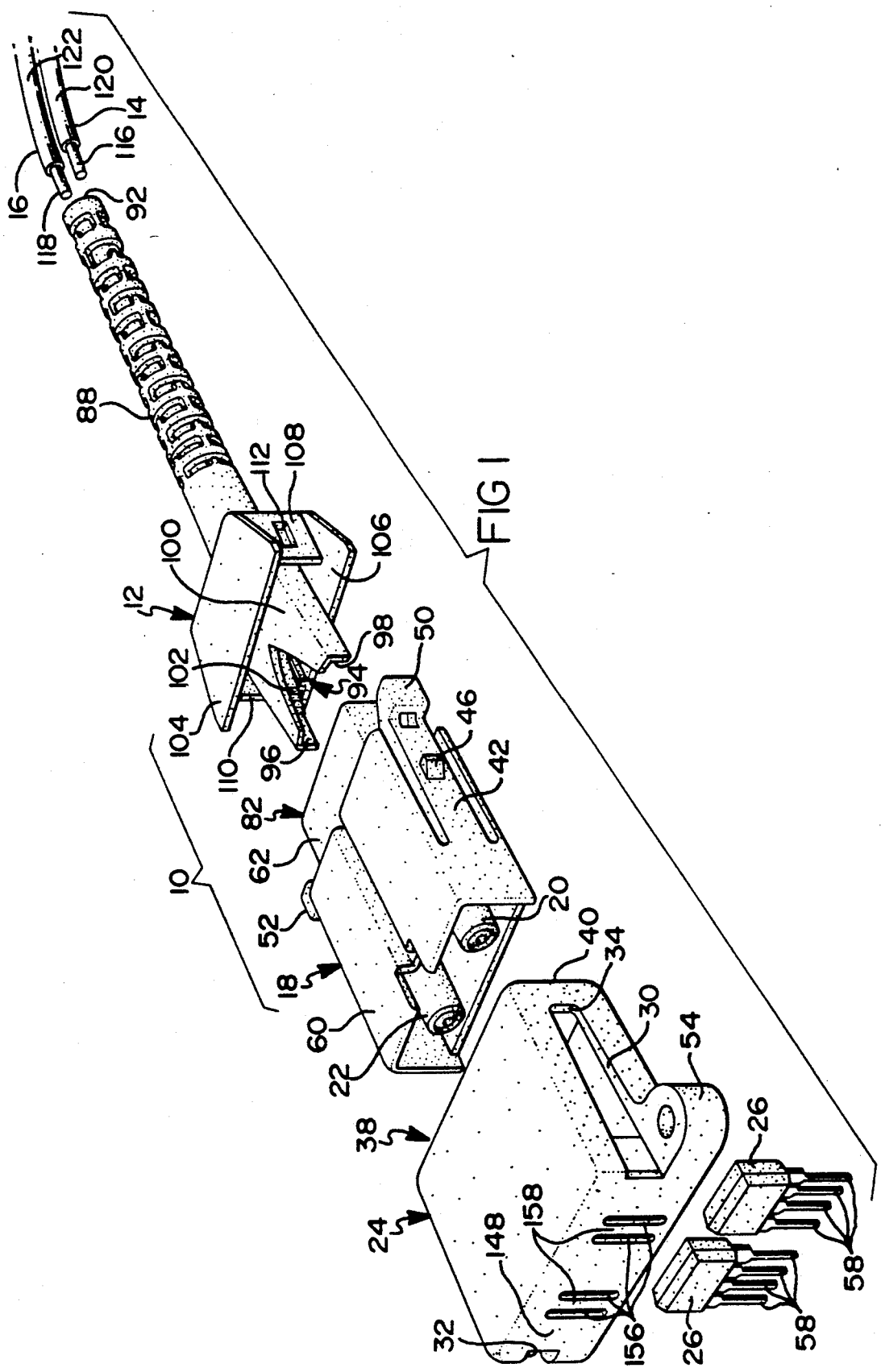

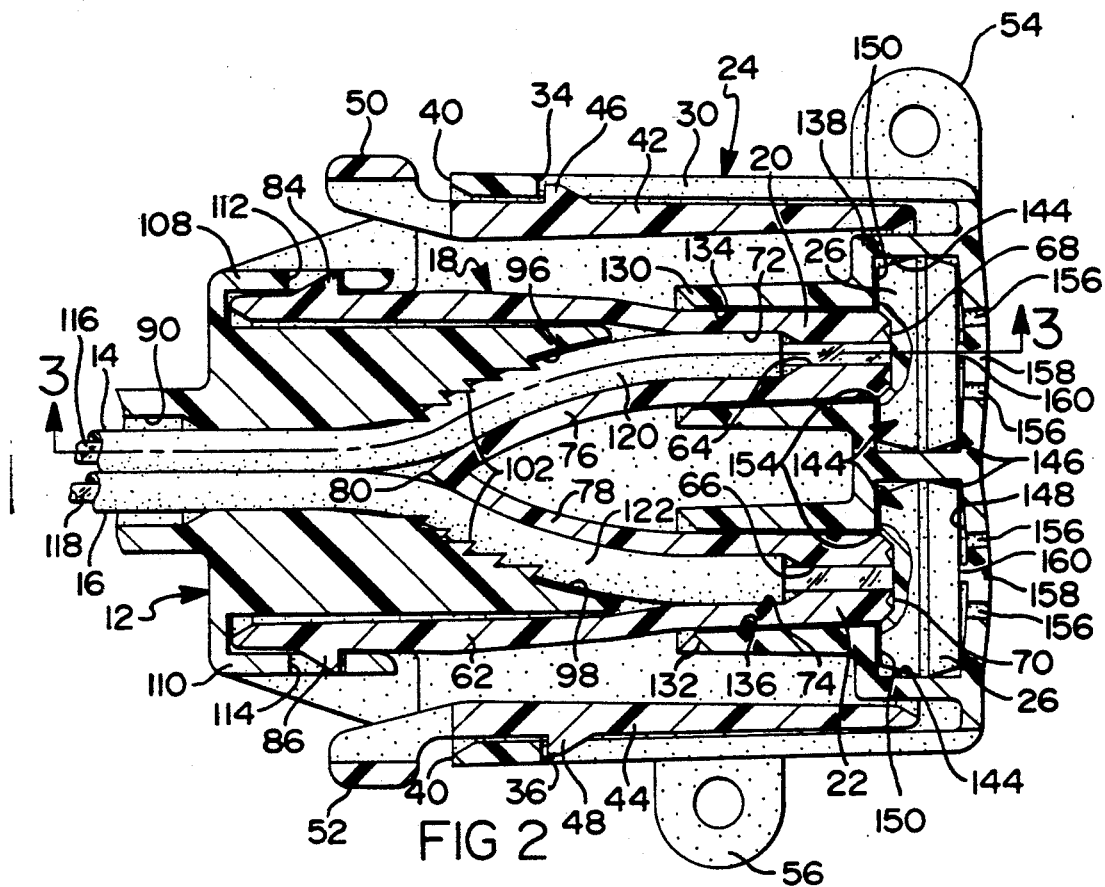
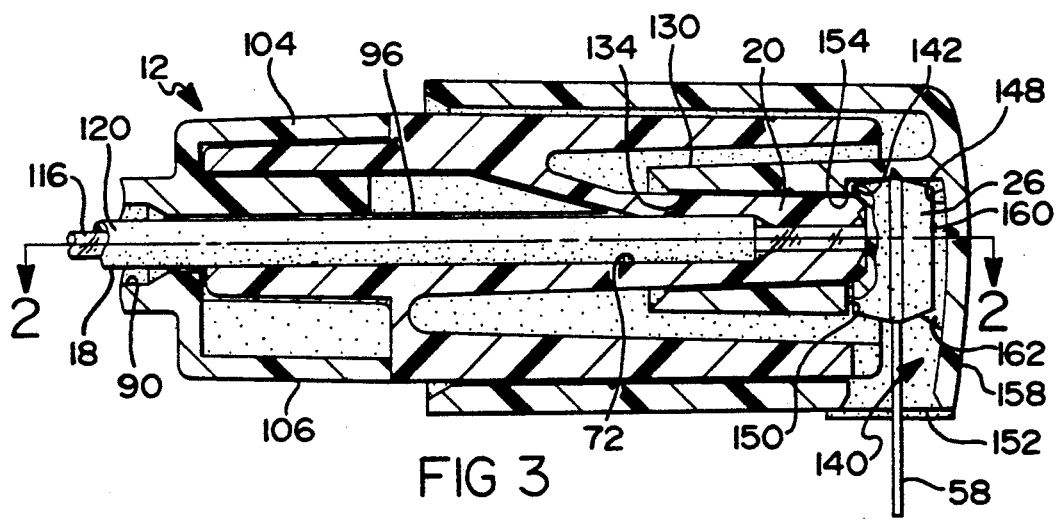

FIBER OPTIC CONNECTION SYSTEM AND METHOD

BACKGROUND OF THE INVENTION

This invention relates generally to fiber optic connection systems and, more particularly, to a connection system comprising a fiber optic cable terminal and a header for connecting the terminal to an electro-optical device or other cable.

Optical fibers used for data transmission are most often supplied in cable form in which the cable comprises a pair of jacketed fibers carried within a protective sheath. Each jacketed fiber comprises a plastic fiber core, a thin cladding, and a protective jacket which can include strain relief fibers.

Connecting the fiber optic cable to electro-optical devices or other cable requires the provision of a terminal on the cable end. The termination of the cable is often performed as a field operation, such as when installing data transmission systems, such as computer LANs (Local Area Networks).

To provide a durable and optically efficient interface between a fiber end and an electro-optical device, it is preferable to mount the fiber end in a suitable terminal connector in a manner that will provide good signal transmission. It is also necessary to properly and reliably align the fiber ends and engage the ends with the electro-optical devices to enable effective data transmission across the interface.

Many different connection systems have been developed to connect optical fiber ends with electro-optical devices. One such system is shown in U.S. Pat. No. 4,678,264 to Bowen et al in which a cable containing both electrical and optical fibers is provided with a terminal in which the fibers are adhesively mounted. This connector is then inserted into a header mounted on a circuit board and latched by connector lock tabs which engage mating header slots.

This arrangement has several shortcomings. There is no provision to bias the terminal ends into engagement with the devices to assure a good optical interface. The adhesive mounting of the fiber end in the terminal must be carefully performed to prevent fouling of the fiber end with adhesive and is not suitable to field use. The disclosed arrangement is unduly complex and, therefore, expensive.

Another connection assembly is illustrated in U.S. Pat. No. 4,875,755 to Burgos et al. A cable is inserted through a flexible boot which fits in a housing. The cable is stripped and the two fiber ends are inserted into and cemented in ferrules that are retained in spaced cavities. Electro-optical devices are mounted in a cover plate which is screwed onto the housing. Compression springs in the cavities bias the ferrules into contact with the electro-optical devices.

While this arrangement provides for biasing the fiber ferrule ends into contact with the electro-optical devices, it requires the provision of two discrete compression springs. It again requires the use of adhesive. It also is an expensive and complex assembly.

An improved connection system is disclosed in U.S. Pat. No. 4,993,803 by Suverison et al and assigned to the assignee herein. A ferrule is clamped to a fiber jacket and the fiber end is processed. The ferrule is slidable in a two-part terminal body. The terminal is inserted into a header housing an electro-optical device and latched. A compression spring biases the ferrule to contact the fiber end with the device. The terminal and header also carry electrical contacts. A separate spring is required for each fiber ferrule.

A simpler connection system is shown in U.S. Pat. No. 4,479,696 to Lubin et al. Here a single fiber is mated to a single electro-optical device mounted in a pocket of a header. The header contains a bifurcated extension that includes a receptacle for a fiber terminal fitting. The fitting has a peripheral frusto-conical rib which is engaged by mating surfaces on the header upon forcing of the terminal into the receptacle to a position adjacent the electro-optical device. The mating header surfaces are so positioned as to exert a wedging force on the rib. The axial component of this wedging force biases the terminal fitting into engagement with the device. How the fiber is mounted in the terminal is not disclosed.

Although this arrangement eliminates springs, it presents a paradox. There is no positive latch. The only force maintaining the terminal in contact with the header is the axial component of the wedging force. If this force is to be substantial, so will be the force required to insert the terminal. Since the method of mounting the terminal on the fiber optic cable is not disclosed, the problem of dealing with the substantial axial stress inherent in inserting the terminal in the header is not addressed.

To enable the widespread use of fiber optics in data transmission, it is necessary to simplify the connection system and to provide one which is both economical and reliable. There is a distinct need for a simple and inexpensive connection system for mating the end of an optical fiber with an electro-optical device. There is also a need for a simple, inexpensive and effective terminal connector for a fiber optic cable.

SUMMARY OF THE INVENTION

It is an object of this invention to provide an improved connection system for connecting an optical fiber to an electro-optical device.

It is another object of this invention to provide an improved connection system for connecting a fiber optic cable having a pair of jacketed fibers to a pair of electro-optical devices.

It is yet another object of this invention to provide an improved header connector for a fiber optic terminal and an electro-optical device.

It is a further object of this invention to provide an improved terminal connector for an optical fiber.

It is a yet further object of this invention to provide an improved terminal connector for a fiber optic cable having a pair of jacketed fibers.

It is a still further object of this invention to provide an improved method of forming a connector terminal for a fiber optic cable.

In one aspect, this invention features a connection system for connecting a fiber optic cable to an electro-optical device, comprising a terminal connector for the cable having interconnecting first and second body members and a header. The first body member includes a terminal projection having an exit aperture for receiving a fiber therethrough and a guide wall for a jacketed fiber extending rearwardly from the projection. The second body member includes an entrance aperture for a fiber optic cable and a second wall formed to complement the guide wall in spaced relation upon interconnection of the body members to define a guide channel for the jacketed fiber. A plurality of gripper teeth are formed on the surface of the second wall for engaging the jacketed fiber to trap it against the guide wall upon interconnection of the body members. The header comprises a housing having a receptacle for receiving the terminal projection upon connection of the terminal connector to the header. First latch means are provided on the connector and the housing for connecting the terminal connector to the header to retain the projection within the receptacle. The header has a pocket for receiving the electro-optical device, second latch means for latching the device within the pocket, and a spring member carried by the housing for biasing the device into an operating position relative to the terminal projection.

In another aspect, this invention features a connection system for connecting a fiber optic cable, having a pair of jacketed fibers, to a pair of electro-optical devices, comprising a terminal connector for the cable, having interconnecting first and second body members, and a header. The first body member includes a pair of spaced terminal projections, each having an exit aperture for receiving a fiber therethrough, and a pair of inner guide walls for jacketed fibers extending rearwardly and convergingly from each projection. The second body member includes an entrance aperture for a fiber optic cable and spaced outer walls formed to complement the inner guide walls in spaced relation upon interconnection of the body members to define diverging guide channels for separated jacketed fibers. A plurality of gripper teeth are formed on the inner surfaces of the outer walls for engaging the jacketed fibers to trap them against the inner walls upon interconnection of the body members. The header comprises a housing having a pair of spaced receptacles for receiving the terminal projections upon connection of the terminal connector to the header. First latch means are provided on the connector and the housing for connecting the terminal connector to the header to retain the projections within the receptacles. The header has spaced pockets for receiving the electro-optical devices, second latch means for latching the devices within the pockets, and spring members carried by the housing for biasing each of the devices into an operating position relative to a terminal projection.

In yet another aspect, this invention features a header connector for providing a data link between a fiber optic terminal and an electro-optical device. A header housing has a receptacle for receiving the terminal, first latch means for retaining the terminal within the receptacle upon insertion, a pocket for receiving the electro-optical device, and second latch means for latching the device within the pocket. A spring member is carried by the housing for biasing the device into an operating position relative to the terminal.

In a further aspect, this invention features a terminal connector for a fiber optic cable having a jacketed fiber which comprises interconnecting first and second body members. The first body member includes a terminal projection having an exit aperture for receiving a fiber therethrough and a guide wall for a jacketed fiber extending rearwardly from the projection. The second body member includes an entrance aperture for a fiber optic cable, a second wall formed to complement the guide wall in spaced relation upon interconnection of the body members to define a guide channel for the jacketed fiber. A plurality of gripper teeth are formed on the surface of the second wall for engaging the jacketed fiber to trap it against the guide wall upon interconnection of the body members.

In a yet further aspect, this invention features a terminal connector for a fiber optic cable having a pair of jacketed fibers, comprising interconnecting first and second body members. The first body member comprises a pair of spaced terminal projections, each including an exit aperture for receiving a fiber therethrough, and a pair of inner guide walls for jacketed fibers extending rearwardly and convergingly from each projection. The second body member comprises an entrance aperture for a fiber optic cable, spaced outer walls formed to complement the inner guide walls in spaced relation upon interconnection of the body members to define diverging guide channels for separated jacketed fibers, a plurality of gripper teeth formed on the inner surfaces of the outer walls for engaging the jacketed fibers to trap them against the inner walls upon interconnection of the body members.

In a still further aspect, this invention features a method of forming a connector terminal for a jacketed fiber optic cable which includes two jacketed fibers carried in a protective sheath. The method comprises the steps of forming a first body member with a pair of spaced terminal projections, each including an exit aperture for receiving a fiber therethrough, and a pair of inner guide walls for jacketed fibers extending rearwardly and convergingly from each projection. A second body member is formed with an entrance aperture for a fiber optic cable, spaced outer walls to complement the inner guide walls in spaced relation upon interconnection of the body members to define diverging guide channels for the jacketed fibers, and with a plurality of gripper teeth on the inner surfaces of the outer walls. A fiber optic cable is inserted through the entrance aperture into the second body, the protective sheath is removed to expose the jacketed cables, and the ends of the cables are stripped to expose the fibers. The cables are trained along the guide walls of the first body member, with the fiber ends projecting out of the exit apertures, and the body members are interconnected to engage the gripper teeth with the fiber jackets to trap the cables against the inner walls within the housing. Finally, a smooth, flat end surface is formed on the fiber ends.

These and further objects and features of the invention will become more readily apparent upon reference to the following detailed description of a preferred embodiment and the attached drawings, in which:

BRIEF DESCRIPTION OF THE DRAWINGS

FIG. 1 is an exploded perspective view of the component parts of a fiber optic connection system comprising a two-piece cable terminal and a header according to this invention;

FIG. 2 is a lateral, longitudinal sectional view of the connection system of FIG. 1, taken along line 2—2 of FIG. 3 and illustrating all components of the system operatively interconnected; and FIG. 3 is a vertical, longitudinal sectional view, taken along line 3—3 of FIG. 2 and further illustrating details of the connection system according to this invention.

DETAILED DESCRIPTION OF THE INVENTION

As illustrated in FIG. 1 of the drawing, the fiber optic connection system comprises a fiber optic cable terminal connector 10 which includes a cable body member 12 for receiving a fiber optic cable containing two jacketed optical fibers 14, 16. A terminal body member 18 interconnects with cable body member 12 to form terminal connector 10 and includes a pair of spaced, slightly tapered and flexible projections 20, 22 which contain the terminal ends of fibers 14, 16.

A header 24 is provided to house a pair of identical electro-optical devices 26 and to receive projections 20, 22 into optical connection with the devices 26. Header 24 includes a pair of longitudinal side slots 30, 32 which terminate in shoulders 34, 36. The mouth 38 of header 24 for receiving the terminal body member 18 of terminal connector 10 is defined by a peripheral end wall 40.

Terminal body member 18 includes a pair of spring arms 42, 44 having ramped locking tangs 46, 48 which engage end wall 40 upon insertion. This engagement forces spring arms 42, 44 inwardly to enable full insertion, whereupon tangs 46, 48 spring outwardly and engage shoulders 34, 36 to lock terminal connector 10 to header 24.

The spring arms 42, 44 terminate in finger tabs 50, 52 which can be manually grasped to depress spring arms 42, 44 sufficiently to disengage tangs 46, 48 from shoulders 34, 36 and enable withdrawal of terminal connector 10 from header 24. Tabs 50, 52 can also be utilized to eliminate the resistance caused by the tangs 46, 48 engaging end wall 40 during insertion of terminal connector 10.

Header 24 includes apertured mounting bosses 54 and 56 for mounting the assembled terminal connector 10 and header 24 on a printed circuit board (not shown), with the electrical leads 58 of devices 26 conventionally received within holes in the board.

Referring now to FIGS. 2 and 3, terminal body portion 18 comprises an outer housing 60, which includes the spring arms 42, 44, and an inner receptor housing portion 62 that mounts and forms a rearward extension of projections 20, 22. Interiorly, projections 20, 22 include fiber channels 64, 66 which extend rearwardly from exit apertures 68, 70.

Rearwardly, fiber channels 64, 66 open into enlarged cable guide channels 72, 74 formed by the inside of inner housing portion 62 and inner cable guide walls 76, 78. These guide walls 76, 78 extend rearwardly to a point of convergence at 80, forming a guide "v". Inner housing 62 has a rearward opening 82 and a pair of side-mounted external ramped locking tangs 84, 86.

Cable body member 12 has an elongated cable guard 88 that includes a cable channel 90 extending from an entrance aperture 92 to a cable splitter chamber 94. The chamber 94 is defined by diverging outer walls 96, 98 and a bifurcated supporting top wall 100. The outer walls 96, 98 have superficial serrations or gripper teeth 102 and are profiled to complement guide walls 76, 78 upon mating of bodies 12 and 18, as later described. Cable body member 12 includes upper and lower mounting flanges 104, 106 and side walls 108, 110 that include lock notches 112, 114.

The fiber optic cable is terminated as follows. The cable sheath is stripped away, exposing the cable strands 14, 16, which comprise clad plastic fibers 116, 118 and protective jacketing 120, 122. The cable strands 14, 16 are inserted into entrance aperture 92, through cable channel 90 and into splitter chamber 94.

Jacketing 120, 122 is stripped sufficiently to extend fibers 116, 118 through fiber channels 64, 66 and out exit apertures 68, 70. The strands are carefully trained along guide walls 76, 78 and fibers 116, 118 are inserted through channels 64, 66 so that the fiber ends project through exit apertures 68, 70 exteriorly of projections 20, 22.

Cable body member 12 is then mated with terminal body member 18 to form terminal connector 10 as follows. Body member 12 is pushed into member 18, with its bifurcated projection 96, 98, 100 entering housing opening 82 and side walls 108, 110 embracing the sides of inner housing 62 and ramping over lock tangs 84, 86.

The teeth 102 will gradually grip the jacketing 120, 122 until mating is completed, when lock tangs 84, 86 engage lock slots 112, 114 in side walls 108, 110. The fiber optic strands 14, 16 are now trapped by teeth 102 between the respective pairs of complementary walls 76 and 96, and 78 and 98.

Several design parameters of this terminal connector 10 are important. The dimensions of gripper teeth 102 should be chosen so that the teeth grip jacketing 120, 122 firmly enough to effect retention without so distorting fibers 116, 118 to cause light signal degradation. The profile of the complementary wall pairs 76, 96 and 78, 98 should be chosen to provide a large enough curvature to prevent boundary light leakage.

The termination is then completed by finishing the ends of fibers 116, 118. The fiber ends are snipped off a predetermined distance beyond the exit apertures 68, 70 in projections 20, 22. The fiber ends are then given a flat, smooth finish by a hot plate melting process. The terminal 10 is now complete and ready for mating with header 24.

As shown in FIGS. 2 and 3, header 24 includes a pair of interior spaced receptacles 130, 132 having slightly tapered interior surfaces 134, 136 to complement the shape of projections 20, 22. Receptacles 130, 132 are mounted on a base portion 138 which houses a pair of identical spaced pockets 140.

Each of the pockets 140 is defined by a top wall 142, and spaced end walls 144, 146, and side walls 148, 150, which define a bottom opening 152 for receiving the electro-optical devices 26. Side walls 150 include apertures 154 opening into the interior of receptacles 130 and 132 and are spaced from walls 148 a distance greater than the thickness of devices 26.

As best seen in FIG. 1, the rear walls 148 are common and include pairs of spaced slits 156 which form rails 158 centrally of the wall and opposite apertures 154. Interiorly, the rails 158 each have a rib 160 which protrudes into pocket 140. A lock tang 162 extends from the bottom of each rib 160.

The connection system is assembled as follows. Electro-optical devices 26 are inserted through bottom openings 152 into pockets 140. To complete insertion, the devices 140 are forced over lock tangs 162, which snap over the bottom edges of the devices to retain them in the pockets against inadvertent removal. The rails will force the devices against front walls 150, with the window 164 of each device in registry with apertures 154.

The terminal connector 10 is then mated with header 24 by inserting housing 60 through mouth 38 until projections 20, 22 enter receptacles 130, 132. Tangs 46, 48 will engage the sides of end wall 40, camming spring arms 42, 44 inwardly until insertion is complete, when lock tangs 46, 46 will snap out to engage shoulders 34 to lock the terminal connector 10 to header 24.

In this assembled state, the ends of projections 20, 22 extend through the apertures 154 to engage device windows 164. The design of the header and the terminal connector require the projections 20, 22 to displace the devices 26 rearwardly of the pockets into engagement with the rear walls before the lock tangs 46, 48 can spring outward to engage the header locking shoulders 34, 36. Because of the protruding ribs 160, this action stresses rails 158 to provide sufficient bias to maintain engagement of the fiber ends carried by projections 20, 22 and the device windows 154.

This three-part plastic connection system is maintained assembled by lock tangs 84, 86 and 46, 48, while the electro-optical devices are retained by tangs 162. No springs are required. Thus, this invention provides a simple, inexpensive and effective connection system for optically linking a fiber optic cable and an electro-optical device that utilizes an improved termination method and structure and an improved header.

While the connection system has been illustrated with two fibers, its principles apply equally to a single or multiple fiber connection. Thus, while only a preferred embodiment has been shown and described, obvious modifications are contemplated within the scope of this invention and the following claims.

We claim:

1. A terminal connector for a fiber optic cable having a pair of jacketed fibers, comprising interconnecting first and second body members, the first body member comprising a pair of spaced terminal projections, each including an exit aperture for receiving a fiber therethrough, and a pair of inner guide walls for jacketed fibers extending rearwardly and convergingly from each projection, and the second body member comprising an entrance aperture for a fiber optic cable, spaced outer walls formed to complement the inner guide walls in spaced relation upon interconnection of the body members to define diverging guide channels for split-apart jacketed fibers, a plurality of gripper teeth formed on the inner surfaces of the outer walls for engaging the jacketed fibers to trap them against the inner walls upon interconnection of the body members.

2. The terminal connector of claim 1, wherein the inner and outer walls are formed with a curvature sufficient to preclude light signal degradation from the fibers.

3. The terminal connector of claim 2, wherein the inner guide walls are interconnected to form a "V" by extending rearward to a point of convergence.

4. The terminal connector of claim 1, wherein the gripper teeth are spaced from the inner guide walls upon interconnection of the body members to assure sufficient penetration of the cable jackets to assure cable retention within the housing without causing light signal degradation.

5. A method of forming a connector terminal for a jacketed fiber optic cable which includes two jacketed fibers carried in a protective sheath, comprising the steps of forming a first body member with a pair of spaced terminal projections, each including an exit aperture for receiving a fiber therethrough, and a pair of inner guide walls for jacketed fibers extending rearwardly and convergingly from each projection, forming a second body member having an entrance aperture for a fiber optic cable, spaced outer walls formed to complement the inner guide walls in spaced relation upon interconnection of the body members to define diverging guide channels for the jacketed fibers, and a plurality of gripper teeth formed on the inner surfaces of the outer walls, inserting a fiber optic cable through the entrance aperture into the second body, removing the protective sheath to expose the jacketed cables, stripping the ends of the cables to expose the fibers, training the cables along the guide walls of the first body member, with the fiber ends projecting out of the exit apertures, interconnecting the body members to engage the gripper teeth with the fiber jackets to trap the cables against the inner walls, within the housing, and providing a smooth, flat end surface on the fiber ends.

6. The method of claim 5, wherein the end surface on the fiber ends is provided by the steps of cutting off the fiber a predetermined distance beyond the exit aperture and hot plate melting the fiber end to provide the flat, smooth surface.

7. The method of claim 5, further including the step of providing the inner and outer walls with a curvature sufficient to preclude light signal degradation from the fibers.

8. The method of claim 5, further including the step of forming the gripper teeth to be spaced from the inner guide walls upon interconnection of the body members to assure sufficient penetration of the cable jackets to assure cable retention within the housing without causing light signal degradation.

9. The method of claim 5, wherein the end surface on the fiber ends is provided by the steps of cutting off each fiber a predetermined distance beyond the exit aperture and hot plate melting the fiber end to provide the flat, smooth surface.

10. A connection system for connecting a fiber optic cable having a pair of jacketed fibers to a pair of electro-optical devices, comprising a terminal connector for the cable having interconnecting first and second body members, wherein the first body member includes a pair of spaced terminal projections, each having an exit aperture for receiving a fiber therethrough, and a pair of inner guide walls for jacketed fibers extending rearwardly and convergingly from each projection, and the second body member includes an entrance aperture for a fiber optic cable, spaced outer walls formed to complement the inner guide walls in spaced relation upon interconnection of the body members to define diverging guide channels for separated jacketed fibers, a plurality of gripper teeth formed on the inner surfaces of the outer walls for engaging the jacketed fibers to trap them against the inner walls upon interconnection of the body members, and a header comprising a housing having a pair of spaced receptacles for receiving the terminal projections upon connection of the terminal connector to the header, first latch means on the connector and the housing for connecting the terminal connector to the header to retain the projections within the receptacles, spaced pockets for receiving the electro-optical devices, second latch means for latching the devices within the pockets, and spring members carried by the housing for biasing each of the devices into an operating position relative to a terminal projection.

11. The connection system of claim 10, wherein the spring members are spring rails formed integrally with the housing.

12. The connection system of claim 11, wherein the second latch means is a locking tang carried by each spring rib for locking engagement with a portion of the device upon insertion of a device into operating position within the pocket, thus preventing inadvertent removal of the device from the pocket.

13. The connection system of claim 10, wherein each pocket comprises a top wall, pair of end walls, an apertured front wall opening into the receptacle, and a rear wall, with the end, front and rear walls defining a pocket entrance opposite the top wall for receiving the device therethrough, the rear wall including a pair of spaced through slits defining a spring member as an integral rib.

14. The connection system of claim 13, wherein each spring rib normally projects into its pocket for engagement and deflection by a device when inserted to provide the force biasing the device into operating position.

15. The connection system of claim 14, wherein the second latch means is a locking tang carried by each spring rib for locking engagement with a portion of a device upon insertion of the device into operating position within a pocket, thus preventing inadvertent removal of the device from the pocket.

16. The connection system of claim 10, wherein each pocket comprises a top wall, pair of end walls, an apertured front wall opening into the receptacle, and a rear wall, with the end, front and rear walls defining a pocket entrance opposite the top wall for receiving a device therethrough, the rear wall including spaced through slits defining a pair of integral rails as spring members, the spring rails normally projecting into the pocket for engagement and deflection by a device when inserted to provide the force biasing the device into operating position.

17. The connection system of claim 16 wherein the second latch means is a locking tang carried by each spring rib for locking engagement with a portion of a device upon insertion of the device into operating position within the pocket, thus preventing inadvertent removal of the device from the pocket.

18. A connection system for connecting a fiber optic cable to an electro-optical device, comprising
a terminal connector for the cable having interconnecting first and second body members, wherein
the first body member includes a terminal projection having an exit aperture for receiving a fiber therethrough, and a guide wall for a jacketed fiber extending rearwardly from the projection, and
the second body member includes an entrance aperture for a fiber optic cable, a second wall formed to complement the guide wall in spaced relation upon interconnection of the body members to define a guide channel for the jacketed fiber, a plurality of gripper teeth formed on the surface of the second wall for engaging the jacketed fiber to trap it against the guide wall upon interconnection of the body members, and
a header comprising a housing having a receptacle for receiving the terminal projection upon connection of the terminal connector to the header, first latch means on the connector and the housing for connecting the terminal connector to the header to retain the projection within the receptacle, a pocket for receiving the electro-optical device, second latch means for latching the device within the pocket, and a spring member carried by the housing for biasing the device into an operating position relative to the terminal projection.

19. The connection system of claim 18, wherein the gripper teeth are spaced from the inner guide walls upon interconnection of the body members to assure sufficient penetration of the cable jackets to assure cable retention within the housing without causing light signal degradation.

20. A header connector for providing a data link between a fiber optic terminal and an electro-optical device, comprising a housing, a receptacle in the housing for receiving the terminal, first latch means for retaining the terminal within the receptacle upon insertion, a pocket for receiving the electro-optical device, second latch means for latching the device within the pocket, and a spring member carried by the housing for biasing the device into an operating position relative to the terminal.

21. The header connector of claim 20, wherein the spring member is a spring rib formed integrally with the housing.

22. The header connector of claim 21, wherein the second latch means is a locking tang carried by the spring rib for locking engagement with a portion of the device upon insertion of the device into operating position within the pocket, thus preventing inadvertent removal of the device from the pocket.

23. The header connector of claim 20, wherein the pocket comprises a top wall, pair of end walls, an apertured front wall opening into the receptacle, and a rear wall, with the end, front and rear walls defining a pocket entrance opposite the top wall for receiving the device therethrough, the rear wall including a pair of spaced through slits defining a spring member as an integral rib.

24. The header connector of claim 23, wherein the spring rib normally projects into the pocket for engagement and deflection by the device when inserted to provide the force biasing the device into operating position.

25. The header connector of claim 24, wherein the second latch means is a locking tang carried by the spring rib for locking engagement with a portion of the device upon insertion of the device into operating position within the pocket, thus preventing inadvertent removal of the device from the pocket.

26. The header connector of claim 20, wherein the pocket comprises a top wall, pair of end walls, an apertured front wall opening into the receptacle, and a rear wall, with the end, front and rear walls defining a pocket entrance opposite the top wall for receiving the device therethrough, the rear wall including spaced through slits defining a pair of integral rails as spring members, the spring rails normally projecting into the pocket for engagement and deflection by the device when inserted to provide the force biasing the device into operating position.

27. The header connector of claim 26 wherein the second latch means is a locking tang carried by each spring rib for locking engagement with a portion of the device upon insertion of the device into operating position within the pocket, thus preventing inadvertent removal of the device from the pocket.

28. The header connector of claim 20, wherein the first latch means comprises mutually interengageable portions of the housing and the connector that are cooperable to provide unbiased retention of the terminal within the receptacle.

29. The header connector of claim 28, wherein the spring member is a spring rib integral with the housing.

30. The header connector of claim 29, wherein the second latch means is a locking tang carried by the spring rib for locking engagement with a portion of the device upon insertion of the device into operating position within the pocket, thus preventing inadvertent removal of the device from the pocket.

31. The header connector of claim 28, wherein the pocket comprises a top wall, pair of end walls, an apertured front wall opening into the receptacle, and a rear wall, with the end, front and rear walls defining a pocket entrance opposite the top wall for receiving the device therethrough, the rear wall including a pair of spaced through slits defining a spring member as an integral rib.

32. The header connector of claim 31, wherein the spring rib normally projects into the pocket for engagement and deflection by the device when inserted to provide the force biasing the device into operating position.

33. The header connector of claim 32, wherein the second latch means is a locking tang carried by the spring rib for locking engagement with a portion of the device upon insertion of the device into operating position within the pocket, thus preventing inadvertent removal of the device from the pocket.

34. The header connector of claim 28, wherein the pocket comprises a top wall, pair of end walls, an apertured front wall opening into the receptacle, and a rear wall, with the end, front and rear walls defining a pocket entrance opposite the top wall for receiving the device therethrough, the rear wall including spaced through slits defining a pair of spring members as integral rails, the spring rails normally projecting into the pocket for engagement and deflection by the device when inserted to provide the force biasing the device into operating position.

35. The header connector of claim 34 wherein the second latch means is a locking tang carried by each spring rib for locking engagement with a portion of the device upon insertion of the device into operating position within the pocket, thus preventing inadvertent removal of the device from the pocket.

36. A header connector for providing a data link between a fiber optic terminal connector, having a pair of spaced terminal projections each containing an optical fiber, and a pair of electro-optical devices, comprising a housing having a pair of spaced receptacles for receiving the terminal projections upon connection of the terminal connector to the header, first latch means for connecting the terminal connector to the housing to retain the projections within the receptacles, spaced pockets in the housing for receiving the electro-optical devices, second latch means for latching the devices within the pockets, and spring members carried by the housing for biasing each of the devices into an operating position relative to a terminal projection.

37. The header connector of claim 36, wherein each pocket comprises a top wall, pair of end walls, an apertured front wall opening into the receptacle, and a rear wall, with the end, front and rear walls defining a pocket entrance opposite the top wall for receiving the device therethrough, the rear wall including a pair of spaced through slits defining a spring member as an integral rib.

38. The header connector of claim 37, wherein each spring rib normally projects into its pocket for engagement and deflection by a device when inserted to provide the force biasing the device into operating position.

39. The header connector of claim 38, wherein the second latch means is a locking tang carried by each spring rib for locking engagement with a portion of a device upon insertion of the device into operating position within a pocket, thus preventing inadvertent removal of the device from the pocket.

40. A terminal connector for a fiber optic cable having a jacketed fiber, comprising interconnecting first and second body members, wherein the first body member includes a terminal projection having an exit aperture for receiving a fiber therethrough, and a guide wall for a jacketed fiber extending rearwardly from the projection, and the second body member includes an entrance aperture for a fiber optic cable, a second wall formed to complement the guide wall in spaced relation upon interconnection of the body members to define a guide channel for the jacketed fiber, a plurality of gripper teeth formed on the surface of the second wall for engaging the jacketed fiber to trap it against the guide wall upon interconnection of the body members.

41. The terminal connector of claim 40, wherein the gripper teeth are spaced from the inner guide walls upon interconnection of the body members to assure sufficient penetration of the cable jackets to assure cable retention within the housing without causing light signal degradation.

42. A method of forming a connector terminal for a fiber optic cable having a jacketed fiber, comprising the steps of forming a first body member with a terminal projection including an exit aperture for receiving a fiber therethrough and a guide wall for a jacketed fiber extending rearwardly from the projection, forming a second body member having an entrance aperture for a fiber optic cable, a second wall formed to complement the guide wall in spaced relation upon interconnection of the body members to define a guide channel for the jacketed fiber, and a plurality of gripper teeth formed on the inner surface of the second wall, inserting a fiber optic cable through the entrance aperture into the second body, stripping the ends of the cable to expose the fiber, training the cable along the guide wall of the first body member, with the fiber end projecting out of the exit aperture, interconnecting the body members to engage the gripper teeth with the fiber jacket to trap the cable against the guide wall within the housing, and providing a smooth, flat end surface on the fiber end.

43. The method of claim 42, further including the step of forming the gripper teeth to be spaced from the guide wall upon interconnection of the body members to assure sufficient penetration of the cable jacket to assure cable retention within the housing without causing light signal degradation.

44. The method of claim 42, wherein the end surface on the fiber end is provided by the steps of cutting off the fiber a predetermined distance beyond the exit aperture and hot plate melting the fiber end to provide the flat, smooth surface.

* * * * *